(12) United States Patent
Idegata

(10) Patent No.: US 7,046,303 B2
(45) Date of Patent: May 16, 2006

(54) DIGITAL BROADCASTING RECEIVER OPERATIVE FOR DISPLAYING PICTURE CHARACTERS IN A NON-CENTRAL PORTION OF A SCREEN

(75) Inventor: Osamu Idegata, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 631 days.

(21) Appl. No.: 09/861,602

(22) Filed: May 22, 2001

(65) Prior Publication Data

US 2001/0043284 A1 Nov. 22, 2001

(30) Foreign Application Priority Data

May 22, 2000 (JP) .............................. 2000-150284

(51) Int. Cl.
*H04N 5/50* (2006.01)
*H04N 5/445* (2006.01)

(52) U.S. Cl. ...................... 348/564; 348/474; 348/563; 348/565; 348/569; 348/570; 348/731; 725/38; 725/41; 725/45

(58) Field of Classification Search ........ 348/473–474, 348/563–570, 586, 731–732, 660, 599; 725/38, 725/41, 43–45; H04N 5/445, 5/50
See application file for complete search history.

(56) References Cited

U.S. PATENT DOCUMENTS

| | | | | | |
|---|---|---|---|---|---|
| 5,585,865 | A | * | 12/1996 | Amano et al. ................. | 725/14 |
| 5,726,702 | A | * | 3/1998 | Hamaguchi et al. ........... | 725/55 |
| 5,757,441 | A | * | 5/1998 | Lee et al. ..................... | 348/731 |
| 5,786,845 | A | * | 7/1998 | Tsuria .......................... | 725/32 |
| 5,844,478 | A | * | 12/1998 | Blatter et al. ................ | 348/474 |
| 5,877,817 | A | * | 3/1999 | Moon .......................... | 348/564 |
| 5,900,915 | A | * | 5/1999 | Morrison ...................... | 725/44 |
| 6,008,803 | A | * | 12/1999 | Rowe et al. ................. | 345/721 |
| 6,049,333 | A | * | 4/2000 | LaJoie et al. ............... | 345/718 |
| 6,212,680 | B1 | * | 4/2001 | Tsinberg et al. .............. | 725/39 |
| 6,317,168 | B1 | * | 11/2001 | Seo ............................ | 348/725 |
| 6,320,623 | B1 | * | 11/2001 | Cavallerano et al. ....... | 348/553 |
| 6,373,527 | B1 | * | 4/2002 | Lee ............................. | 348/564 |
| 6,462,784 | B1 | * | 10/2002 | Kohno et al. ............... | 348/563 |
| 6,493,038 | B1 | * | 12/2002 | Singh et al. ................. | 348/565 |
| 6,493,043 | B1 | * | 12/2002 | Bollmann et al. .......... | 348/714 |
| 6,580,462 | B1 | * | 6/2003 | Inoue et al. ................. | 348/460 |
| 6,600,522 | B1 | * | 7/2003 | Kim .......................... | 348/732 |
| 6,710,817 | B1 | * | 3/2004 | Oku et al. ................... | 348/569 |
| 6,732,371 | B1 | * | 5/2004 | Lee et al. ..................... | 725/41 |
| 6,807,676 | B1 | * | 10/2004 | Robbins et al. ............... | 725/39 |

(Continued)

FOREIGN PATENT DOCUMENTS

JP 11-112901 * 4/1999

(Continued)

*Primary Examiner*—Brian P. Yenke
(74) *Attorney, Agent, or Firm*—Westerman, Hattori, Daniels & Adrian, LLP.

(57) ABSTRACT

A CPU carries out such control as to display a received image on the whole of a screen even when a command to acquire program information is issued by a user. In the display of the received image on the whole of the screen in this case, an icon button meaning that an operation for acquiring program information is continued is displayed in a non-central portion of the screen by an OSD circuit. When the icon button is operated by the user, a genre retrieval table is displayed on the screen by the OSD circuit. When a predetermined number of program information can be acquired, the display is automatically switched to the display of the genre retrieval table.

21 Claims, 2 Drawing Sheets

U.S. PATENT DOCUMENTS

| | | | |
|---|---|---|---|
| 6,809,776 B1 * | 10/2004 | Simpson | 348/565 |
| 6,816,201 B1 * | 11/2004 | Fang et al. | 348/468 |
| 6,817,028 B1 * | 11/2004 | Jerding et al. | 725/52 |
| 2001/0056577 A1 * | 12/2001 | Gordon et al. | 725/52 |
| 2003/0088872 A1 * | 5/2003 | Maissel et al. | 725/46 |
| 2003/0179320 A1 * | 9/2003 | Kim | 348/732 |
| 2004/0080673 A1 * | 4/2004 | Townsend et al. | 348/563 |
| 2004/0107438 A1 * | 6/2004 | Sekiguchi et al. | 725/43 |

FOREIGN PATENT DOCUMENTS

| JP | 2000-125221 | * | 4/2000 |
|---|---|---|---|

* cited by examiner

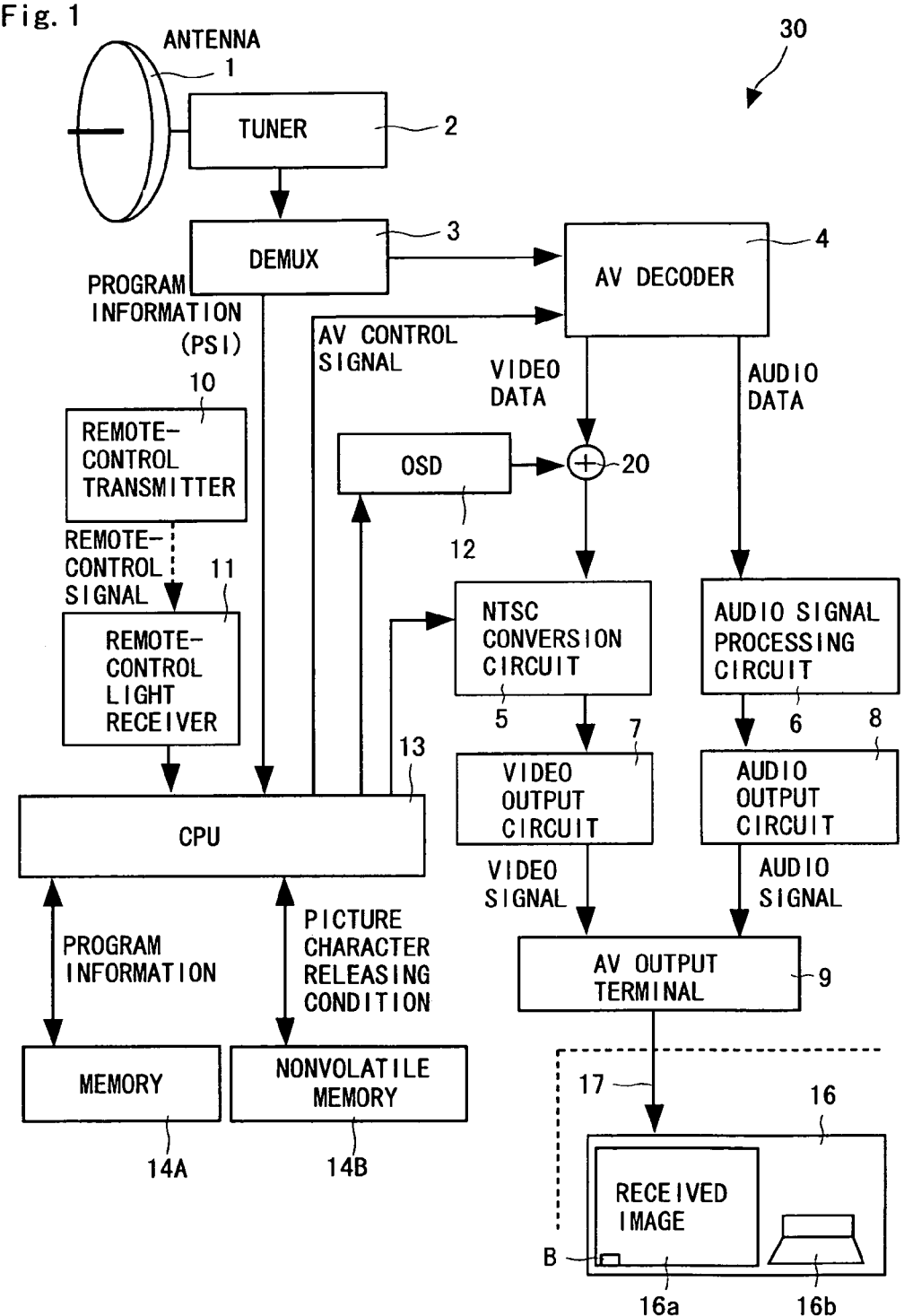

DIGITAL BROADCASTING RECEIVER OPERATIVE FOR DISPLAYING PICTURE CHARACTERS IN A NON-CENTRAL PORTION OF A SCREEN

BACKGROUND OF THE INVENTION

Field of the Invention

The present invention relates generally to a digital broadcasting receiver for receiving digital broadcasting. There is digital broadcasting for compressing a video/audio signal using a digital signal compression technique as well as broadcasting a stream on which video/audio digital signals on a plurality of programs are time-division multiplexed (a transport stream) via a transponder. A plurality of transponders exist. Moreover, a plurality of channels are multiplexed on each of the transponders. Accordingly, the number of channels reaches an enormous number extending to not less than a hundred.

On the other hand, a broadcasting receiver for receiving such digital multichannel broadcasting selects by a tuner one of the plurality of transponders in the digital broadcasting received through a dedicated antenna, selects by demultiplexing processing one of the plurality of channels included in the one transponder, and decodes a digital signal on the selected channel, to output a video/audio signal.

In such digital television broadcasting, service information (the name of a program, the contents of the program, the time when the program begins, the time when the program ends, the genre code of the program, etc.) are also transmitted besides displaying video and audio as in conventional analog broadcasting. On the side of a receiver, it is possible to efficiently select a program desired by a user from multichannel broadcasting by an EPG (Electronic Program Guide) screen display function using an OSD (On-Screen Display) function.

In the actual circumstances, however, significantly long time is required to acquire and display program information from the time when a command to display a program table is issued by the user. Particularly when a genre is retrieved, all service information must be retrieved, and more time is required. Conventionally, when a command to display a program table is issued, output of a received image to the screen is stopped, and the screen is switched to an EPG display screen by OSD. Accordingly, the received image cannot be seen for a significantly long time period. On the other hand, in order to solve such a problem, an EPG is displayed upon being overlapped with the received image. Alternatively, the received image is reduced so that the whole thereof can be seen. However, the received image is difficult to see.

In view of the above-mentioned circumstances, an object of the present invention is to provide a digital broadcasting receiver capable of displaying picture characters at such a position as not to interrupt a received image while displaying the received image on almost the whole of a screen to prevent the received image from being difficult to see, while switching the screen to an information display screen by OSD under predetermined conditions.

SUMMARY OF THE INVENTION

In order to solve the above-mentioned problem, in a digital broadcasting receiver comprising received image display means for receiving digital broadcasting and displaying a received image on a screen, and information display means for producing a display image different from the received image to display the produced display image on the screen, a digital broadcasting receiver according to the present invention is characterized by comprising control means for displaying picture characters in a non-central portion of the screen while displaying the received image on the screen and displaying information on the screen by the information display means instead of displaying the received image on the screen when it is judged that the picture characters are to be released in a state where the picture characters are displayed.

In the above-mentioned construction, the picture characters are displayed in the non-central portion of the screen in a state where the received image is displayed on the screen. Accordingly, the received image is not difficult to see, and the user can know that processing of contents represented by the displayed picture characters does not appear on the screen but is simultaneously performed. When it is judged that the picture characters are to be released, it is possible to see the information display screen based on the processing simultaneously performed.

The digital broadcasting receiver may further comprise program information acquisition means for acquiring program information included in the digital broadcasting, and the control means may be so constructed as to cause the program information acquisition means to perform processing for acquiring the program information when an instruction to start the program information acquisition means is issued, while displaying the picture characters in the non-central portion of the screen while displaying the received image on the screen, and displaying the program information on the screen by the information display means instead of displaying the received image on the screen when it is judged that the picture characters are to be released in a state where the picture characters are displayed.

In the above-mentioned construction, when a command to display a program table or retrieve a genre is issued by the user, the received image is displayed on the screen, and the picture characters are displayed in the non-central portion of the screen until it is judged that the picture characters are to be released. Accordingly, the received image is prevented from being difficult to see, and the user can know that the operation for acquiring the program information is performed. When it is judged that the picture characters are to be released, the program table or the result of the genre retrieval is displayed on the screen.

The digital broadcasting receiver may be so constructed as to display on the screen circumstances where the program information are acquired. Accordingly, the user can know the circumstances where the program information are acquired, thereby dissolving discontent in a case where the user does not know how long he or she should wait until the program is displayed.

The digital broadcasting receiver may judge that the picture characters are to be released when an operation is performed for the displayed picture characters. It may automatically make the judgment when a predetermined number of program information are acquired or when a predetermined time period has elapsed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a digital broadcasting receiver according to an embodiment of the present invention;

DESCRIPTION OF THE PREFERRED EMBODIMENTS

Figure 2A:
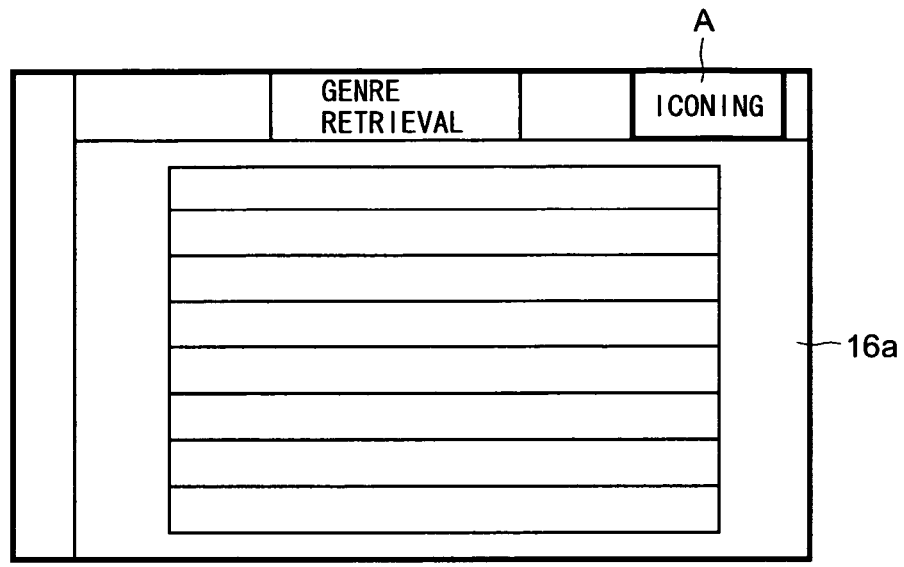
FIG. 2A is an illustration showing an example of a genre retrieval table.

An embodiment of the present invention will be described on the basis of FIGS. 1 and 2, which illustrates a case where a user views BS (Broadcasting via Satellite) digital broadcasting.

An antenna 1 shown in FIG. 1 is arranged in a predetermined direction outdoors, and receives a digital broadcasting signal fed from the BS. The antenna 1 generally comprises a frequency converter, and feeds to a tuner 2 the received/frequency-converted signal.

The tuner 2 takes out a signal having a particular frequency out of received high-frequency digital modulation signals. That is, it performs processing for selecting one of a plurality of transponders in digital broadcasting. Further, the tuner 2 comprises a demodulation circuit, an inverse interleave circuit, an error correcting circuit, and so forth, thereby to demodulate the selected digital modulation signal and output a transport stream.

A demultiplexer (DEMUX) 3 separates the transport stream received from the tuner 2 into a video transport packet and an audio transport packet based on MPEG2 (Moving Picture Experts Group2) and PSI (Program Specific Information). The demultiplexer 3 feeds the video transport packet and the audio transport packet to an AV decoder 4, and feeds service information (SI) added to the PSI, for example, to a CPU 13.

As described in the foregoing, a plurality of channels are multiplexed on the transport stream. Processing for selecting any one of the channels can be performed by taking out from the PSI data indicating which packet ID in the transport stream is used to multiplex the arbitrary channel. The selection of the transport stream (the selection of the transponder) can be made on the basis of the PSI. Further, the service information (SI) include program information (the contents of a program, the time when the program begins, the time when the program ends, the genre code of the program, etc.).

The AV decoder 4 comprises a video decoder for decoding the video transport packet and an audio decoder for decoding the audio transport packet. The video decoder decodes an inputted variable length code to find a quantization factor and a motion vector, to carry out inverse DCT (Discrete Cosine Transformation) and motion compensation based on the motion vector. The audio decoder decodes a coded signal which has been inputted, to generate audio data.

An OSD (On-Screen Display) circuit 12 outputs to an adder 20 bit map data based on character information or color information whose output instruction is issued from the CPU 13. The adder 20 performs processing for incorporating the bit map data into video data outputted from the AV decoder 4. By the OSD circuit 12, the displayed state of an icon or the like, described later, can be realized in addition to display of an EPG (Electronic Program Guide) on the screen based on the service information (SI) included in the above-mentioned PSI received by the CPU 13.

The NTSC conversion circuit 5 receives the video data from the adder 20 and subjects the received video data to digital-to-analog conversion, to convert the obtained analog video data into a composite signal in an NTSC format. The audio signal processing circuit 6 receives the audio data outputted from the AV decoder 4 and subjects the received audio data to digital-to-analog conversion, to generate an analog signal of a right (R) sound and an analog signal of a left (L) sound, for example.

Each of a video output circuit 7 and an audio output circuit 8 comprises an output resistor, an amplifier, or the like. An AV output terminal 9 is provided with an output unit (a set of right and left audio output terminals or the like and a video output terminal). A monitor 16 comprising a CRT (Cathode-Ray Tube) 16a and a speaker 16b is connected to the output unit by a video/audio code 17.

A remote-control transmitter 10 is a transmitter for sending out a command to the broadcasting receiver 30. When a key (not shown) provided in the remote-control transmitter 10 is operated, signal light (a remote-control signal) meaning a command corresponding to the key is fed from a light emitting unit (not shown). A remote-control light receiver 11 receives the signal light emitted when the key in the remote-control transmitter 10 is operated, converts the received signal light into an electric signal, and feeds the electric signal to the CPU 13.

In the present embodiment, a key (not shown) having the function of OSD iconing and releasing the OSD iconing is prepared in the remote-control transmitter 10. When the key is operated in a state where OSD is displayed on the CRT 16a, a received image is displayed on the whole of the screen, and an icon is displayed in a non-central portion of the screen (the lower left of the screen in FIG. 2B). When the key is operated again in the displayed state, an information screen by the OSD is displayed on the whole screen. Further, in the present embodiment, the same operations as described above can be also performed by operating the remote-control transmitter 10, putting a cursor on the icon displayed on the screen (changing the color), and pressing a determination key.

A memory 14A stores service information (the contents of a program, the time when the program begins, the time when the program ends, genre information, etc.) which will constitute a program table. A nonvolatile memory (e.g., an EEPROM (Electrically Erasable and Programmable ROM) 14B stores automatic program information display conditions (information indicating how many program information should be collected or how long time should elapse before the display is automatically switched to the display of the program table or a genre retrieval table on the whole screen), for example. The nonvolatile memory 14B is a writable memory. Accordingly, the condition information can be changed on the side of the user, and the stored contents are held even in a state where no power is applied. The service information may be also stored in the nonvolatile memory 14B.

The CPU 13 performs the following processing as processing related to the present invention.

① The CPU 13 performs processing for storing in the non-volatile memory 14B the condition information inputted using the remote-control transmitter 10 or the like by the user.

② When a command to display a program table or retrieve a genre is issued, service information (SI) required to construct the program table or the genre retrieval table are acquired and are stored in the memory 14A. Description is made by taking genre retrieval as an example. In a case where the command to retrieve a genre is issued, even if a genre retrieval table shown in FIG. 2A is displayed at its beginning, an amount of genre information which can be acquired is small. Therefore, the result of the retrieval is hardly displayed. When an icon button A that reads "iconing" on the upper right of the genre retrieval table shown in FIG. 2A is operated, or when a key (not shown), having the function of OSD iconing and releasing the OSD iconing, which is provided on the remote-control transmitter 10 is operated, a received image is displayed on a screen shown in FIG. 2B, that is, the whole of the screen, and an icon button B that reads "genre retrieval" on the lower left of the screen is displayed by the OSD 12. Processing for retrieving a genre is continued while displaying the received image. When the command to retrieve a genre is issued, the screen shown in FIG. 2B may be displayed as screen display at its beginning.

Figure 2B:
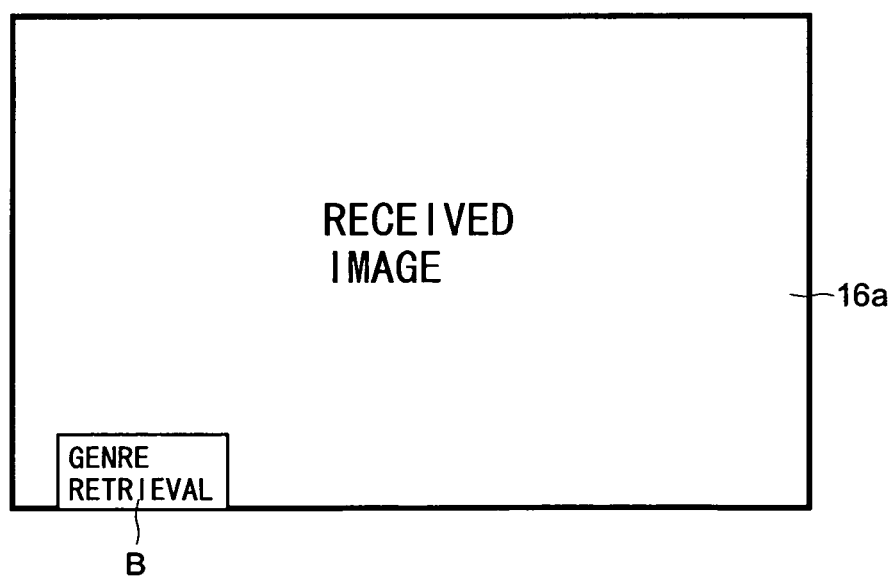
FIG. 2B is an illustration showing a state where a received image is displayed on the whole of a screen, and an icon button that reads "genre retrieval" is displayed on the lower left of the screen.

③ In the state shown in FIG. 2B, it is judged whether or not the icon button B that reads "genre retrieval" on the lower left of the screen is operated, or whether or not a key, having the function of OSD iconing and releasing the OSD iconing, provided in the remote-control transmitter 10 is operated. When it is judged that the icon button B that reads "genre retrieval" or the key is operated, the screen is switched to the screen shown in FIG. 2A, to display the result of the genre retrieval.

④ In the state shown in FIG. 2B, the number of acquired program information or the elapsed time is counted, and comparison processing with the picture character releasing conditions (the number of set programs and the set elapsed time) stored in the nonvolatile memory 14B is performed. When the number of acquired program information or the elapsed time satisfies the picture character releasing conditions, the screen is automatically switched to the screen shown in FIG. 2A, to display the result of the genre retrieval. The function is not always performed, and is performed when the user selects the function.

When the picture character releasing conditions are satisfied, the color of the icon button B that reads "genre retrieval" is changed or is flashed, thereby to inform the user that the releasing conditions are satisfied. When the operation is performed by the user, as in the foregoing item ③, the screen is switched to the screen shown in FIG. 2A, thereby making it possible to also display the result of the genre retrieval.

⑤ In the state shown in FIG. 2B, the number of acquired program information or the elapsed time is counted, and comparison processing with the picture character releasing conditions (the set number of programs and the set elapsed time) stored in the nonvolatile memory 14B is performed, to perform display (character display or graph display) as to how many percents of the set number of programs or the set elapsed time the number of acquired programs or the elapsed time accounts for.

As described in the foregoing, according to the present invention, the picture characters are displayed in the non-central portion of the screen in a state where the received image is displayed on the screen, the received image is not difficult to see, and the user can know that the processing of the contents represented by the displayed picture characters does not appear on the screen but is simultaneously performed. When it is judged that the picture characters are released, it is possible to see an information display screen based on the processing simultaneously performed.

Particularly when the command to display a program table or retrieve a genre is issued by the user, the received image is displayed on the screen, and the picture characters are displayed in the non-central portion of the screen until it is judged that the picture characters are to be released. Accordingly, the received image is prevented from being difficult to see, and the user can know that an operation for acquiring the program information is performed. When it is judged that the picture characters are to be released, the program table or the result of the genre retrieval is displayed on the screen.

If circumstances where the program information are acquired are displayed on the screen, the user can know the circumstances where the program information are acquired, thereby producing the effect of dissolving discontent in a case where the user does not known how long he or she should wait until the program is displayed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver comprising:
   received image display means for receiving digital broadcasting to display a received image on a screen;
   information display means for producing a display image different from said received image and displaying the produced display image on the screen; and
   control means for displaying picture characters in a non-central portion of the screen during processing of the display image in preparation for displaying the display image on the screen while displaying the received image on a majority of the screens, and displaying information on the screen by said information display means instead of displaying the received image on the screen when it is judged that a picture characters display mode is to be released in a state where the picture characters are displayed.

2. The digital broadcasting receiver according to claim 1, further comprising
   program information acquisition means for acquiring program information included in the digital broadcasting,
   said control means causing said program information acquisition means to perform processing for acquiring the program information when an instruction to start the program information acquisition means is issued, while displaying the picture characters in the non-central portion of the screen while displaying the received image on the screen, and displaying the program information on the screen by said information display means instead of displaying the received image on the screen when it is judged that the picture characters are to be released in a state where the picture characters are displayed.

3. The digital broadcasting receiver according to claim 2, a progress condition about the program information acquisition processing is displayed on the screen.

4. The digital broadcasting receiver according to claim 1, wherein it is judged that the picture characters are to be released when an operation is performed for the displayed picture characters.

5. The digital broadcasting receiver according to claim 2, wherein it is judged that the picture characters are to be released when an operation is performed for the displayed picture characters.

6. The digital broadcasting receiver according to claim 3, wherein it is judged that the picture characters are to be released when an operation is performed for the displayed picture characters.

7. The digital broadcasting receiver according to claim 2, wherein it is judged that the picture characters are to be released when a predetermined number of program information are acquired.

8. The digital broadcasting receiver according to claim 3, wherein it is judged that the picture characters are to be released when a predetermined number of program information are acquired.

9. The digital broadcasting receiver according to claim 4, wherein it is judged that the picture characters are to be released when a predetermined number of program information are acquired.

10. The digital broadcasting receiver according to claim 5, wherein it is judged that the picture characters are to be released when a predetermined number of program information are acquired.

11. The digital broadcasting receiver according to claim 6, wherein it is judged that the picture characters are to be released when a predetermined number of program information are acquired.

12. The digital broadcasting receiver according to claim 2, wherein it is judged that the picture characters are to be released when a predetermined time period has elapsed from the time when an instruction to start the program information acquisition means is issued.

13. The digital broadcasting receiver according to claim 3, wherein it is judged that the picture characters are to be released when a predetermined time period has elapsed from the time when an instruction to start the program information acquisition means is issued.

14. The digital broadcasting receiver according to claim 4, wherein it is judged that the picture characters are to be released when a predetermined time period has elapsed from the time when an instruction to start the program information acquisition means is issued.

15. The digital broadcasting receiver according to claim 5, wherein it is judged that the picture characters are to be released when a predetermined time period has elapsed from the time when an instruction to start the program information acquisition means is issued.

16. The digital broadcasting receiver according to claim 6, wherein it is judged tat the picture characters are to be released when a predetermined time period has elapsed from the time when an instruction to start the program information acquisition means is issued.

17. The digital broadcasting receiver according to claim 7, wherein it is judged that the picture characters are to be released when a predetermined time period has elapsed from the time when an instruction to start the program information acquisition means is issued.

18. The digital broadcasting receiver according to claim 8, wherein it is judged that the picture characters are to be released when a predetermined time period has elapsed from the time when an instruction to start the program information acquisition means is issued.

19. The digital broadcasting receiver according to claim 9, wherein it is judged that the picture characters are to be released when a predetermined time period has elapsed from the time when an instruction to start the program information acquisition means is issued.

20. The digital broadcasting receiver according to claim 10, wherein it is judged that the picture characters are to be released when a predetermined time period has elapsed from the time when an instruction to start the program information acquisition means is issued.

21. The digital broadcasting receiver according to claim 11, wherein it is judged that the picture characters are to be released when predetermined time period has elapsed from the time when an instruction to start the program information acquisition means is issued.

* * * * *